(12) United States Patent
Qureshi

(10) Patent No.: US 8,161,242 B2
(45) Date of Patent: Apr. 17, 2012

(54) ADAPTIVE SPILL-RECEIVE MECHANISM FOR LATERAL CACHES

(75) Inventor: Moinuddin K. Qureshi, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 12/184,737

(22) Filed: Aug. 1, 2008

(65) Prior Publication Data
US 2010/0030970 A1 Feb. 4, 2010

(51) Int. Cl.
*G06F 12/02* (2006.01)
(52) U.S. Cl. ........ 711/122; 711/118; 711/119; 711/120; 711/133; 711/134; 711/135; 711/170
(58) Field of Classification Search .......... 711/118–120, 711/122, 133–135, 170
See application file for complete search history.

(56) References Cited

U.S. PATENT DOCUMENTS

| 6,502,171 | B1 | 12/2002 | Arimilli et al. |
| 6,865,647 | B2 | 3/2005 | Olarig et al. |
| 7,281,092 | B2 * | 10/2007 | Rajamony et al. ............ 711/122 |
| 7,454,573 | B2 * | 11/2008 | Buyuktosunoglu et al. .. 711/133 |
| 7,774,549 | B2 * | 8/2010 | Vishin ............................ 711/133 |
| 2006/0112228 | A1 | 5/2006 | Shen |
| 2008/0091880 | A1 * | 4/2008 | Vishin ............................ 711/122 |

OTHER PUBLICATIONS

Qureshi et al., "Adaptive Insertion Policies for High Performance Caching", Proceedings of the 34th Annual International Symposium on Computer Architecture, San Diego, California, 2007, pp. 381-391.

* cited by examiner

*Primary Examiner* — Arpan P. Savla
(74) *Attorney, Agent, or Firm* — Francis Lammes; Stephen J. Walder, Jr.; William J. Stock

(57) ABSTRACT

Improving cache performance in a data processing system is provided. A cache controller monitors a counter associated with a cache. The cache controller determines whether the counter indicates that a plurality of non-dedicated cache sets within the cache should operate as spill cache sets or receive cache sets. The cache controller sets the plurality of non-dedicated cache sets to spill an evicted cache line to an associated cache set in another cache in the event of a cache miss in response to an indication that the plurality of non-dedicated cache sets should operate as the spill cache sets. The cache controller sets the plurality of non-dedicated cache sets to receive an evicted cache line from another cache set in the event of the cache miss in response to an indication that the plurality of non-dedicated cache sets should operate as the receive cache sets.

13 Claims, 7 Drawing Sheets

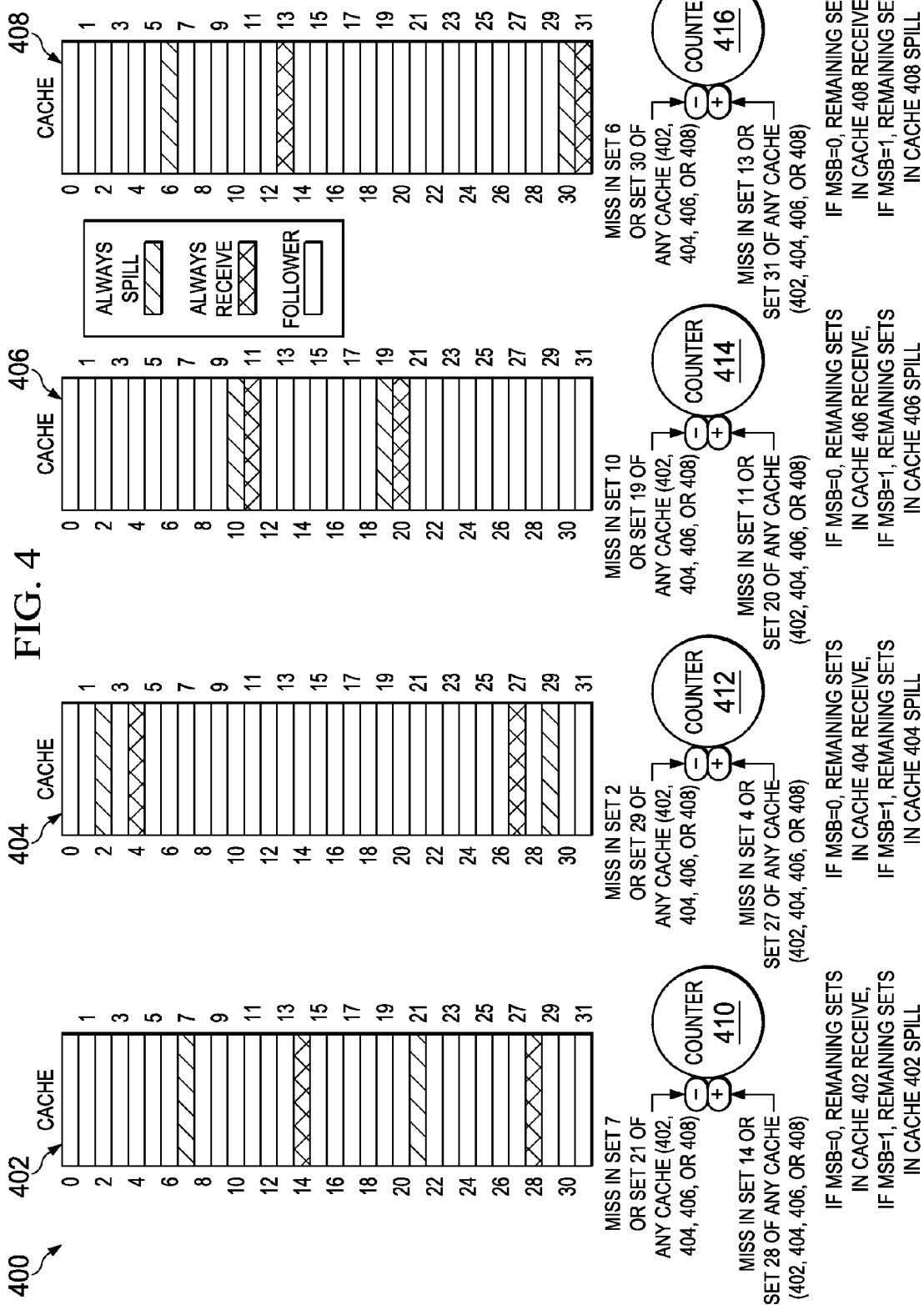

| SET | SetIndex[4:0] | TYPE OF SET |
|---|---|---|
| 0 | 00000 | "SPILL SET" ONLY FOR CACHE_ID=0 |
| 1 | 00001 | "RECEIVE SET" ONLY FOR CACHE_ID=0 |
| 2 | 00010 | "SPILL SET" ONLY FOR CACHE_ID=1 |
| 3 | 00011 | "RECEIVE SET" ONLY FOR CACHE_ID=1 |
| 4 | 00100 | "SPILL SET" ONLY FOR CACHE_ID=2 |
| 5 | 00101 | "RECEIVE SET" ONLY FOR CACHE_ID=2 |
| 6 | 00110 | "SPILL SET" ONLY FOR CACHE_ID=3 |
| 7 | 00111 | "RECEIVE SET" ONLY FOR CACHE_ID=3 |
| 8-31 | 01000-11111 | FOLLOWER SETS FOR ALL CACHES |

600

ADAPTIVE SPILL-RECEIVE MECHANISM FOR LATERAL CACHES

BACKGROUND OF THE INVENTION

1. Field of the Invention

The present application relates generally to an improved data processing apparatus and method and more specifically to an apparatus and method for providing an adaptive spill-receive mechanism for lateral caches.

2. Background of the Invention

Chip multi-processors (CMP) have become a popular design point for industry. An important decision in architecting a CMP is to organize the last level cache (LLC). A shared LLC has the advantage of dynamically sharing cache capacity among the cores; however, a shared LLC suffers from performance isolation, increased access latency, and port contention. Therefore, some of the CMP designs have chosen to have a private LLC for each of the individual cores. Private caches also have an advantage of design simplicity as private caches facilitate a tiled architecture making it possible to build large scale CMPs.

In a CMP configuration in which there are several cores and each core has a private LLC, the caches at the same level of a cache hierarchy are commonly referred to as lateral caches. A challenge in managing such private cache architecture is to share cache capacity when one processor needs more cache and other processors have extra cache capacity. This is commonly achieved by employing a cache spill mechanism among lateral caches. When a line is evicted from a cache, instead of discarding the line, the line can be placed in another cache at the same level. If done intelligently, lateral cache spills can improve cache performance considerably. For example, workloads that have a small working set can provide the excess cache space to workloads that continue to benefit from extra cache thereby increasing performance.

However, not all workloads that have large working set benefit from extra cache. For example, workloads that have a streaming access pattern and a huge working set have very little cache reuse and therefore, do not benefit from cache. Spilling cache lines evicted from such applications into other caches may in-fact degrade cache performance of other applications.

BRIEF SUMMARY OF THE INVENTION

In one illustrative embodiment a method, in a data processing system, is provided for improving cache performance in a data processing system. The illustrative embodiments monitor a counter associated with a cache. The illustrative embodiments determine whether the counter indicates that a plurality of non-dedicated cache sets within the cache should operate as spill cache sets or receive cache sets. Responsive to an indication that the plurality of non-dedicated cache sets should operate as the spill cache sets, the illustrative embodiments set the plurality of non-dedicated cache sets to spill an evicted cache line to an associated cache set in another cache in the event of a cache miss. Responsive to an indication that the plurality of non-dedicated cache sets should operate as the receive cache sets, the illustrative embodiments set the plurality of non-dedicated cache sets to receive an evicted cache line from another cache set in the event of the cache miss.

In other illustrative embodiments, a computer program product comprising a computer usable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 illustrates an embodiment of the proposed mechanism for a data processing system with four caches each associated with one processor in accordance with an illustrative embodiment;

DETAILED DESCRIPTION OF THE INVENTION

Figure 1:
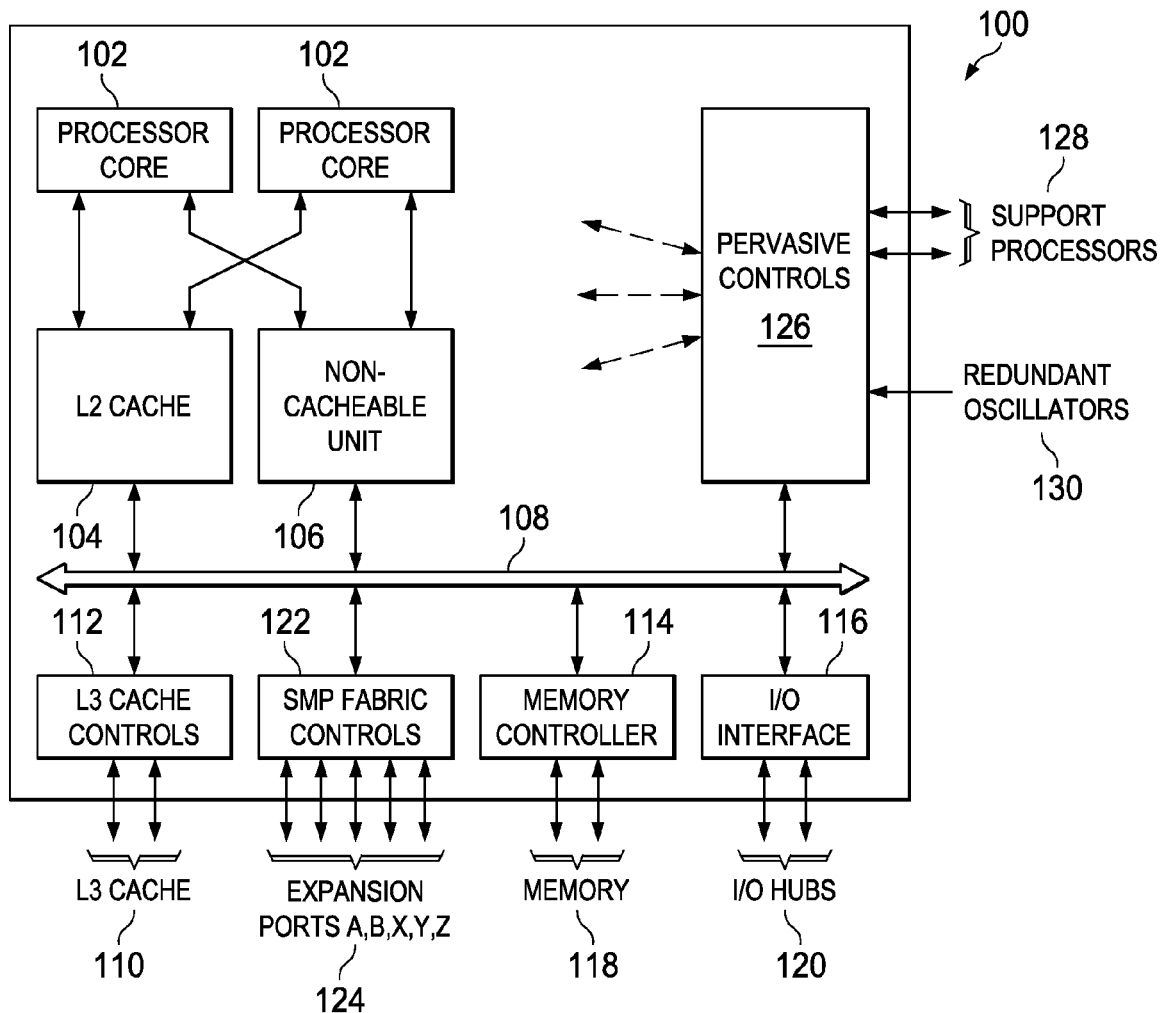
FIG. 1 depicts a pictorial representation of an example distributed data processing system in which aspects of the illustrative embodiments may be implemented.

The illustrative embodiments provide a mechanism where each cache learns whether the cache should perform as a spill cache or a receive cache for best overall performance. A spill cache is a local cache associated with a processor or processor core that may send a cache entry in another local cache associated with another processor or core processor. A receive cache is a local cache associated with a processor or processor core that may receive and store a cache entry from another local cache associated with another processor or core processor. The mechanism is implemented by dedicating some sets of each cache to "always spill" and some sets of each cache to "always receive". A saturating counter for each cache tracks which of the two policies incurs fewest misses on the dedicated sets. The remaining sets of the cache use the policy that has fewest misses as indicated by the most significant bit of the saturating counter.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
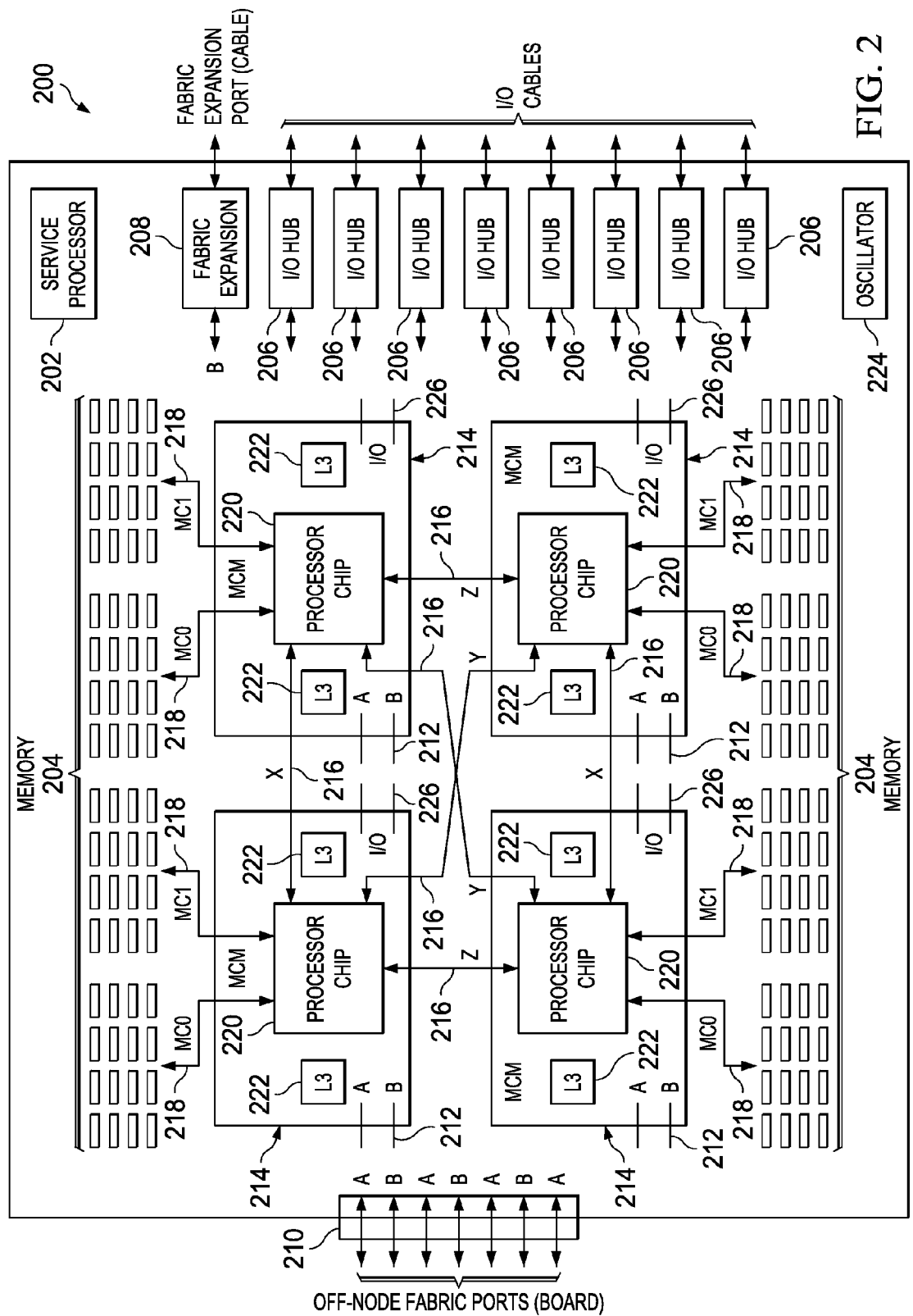
FIG. 2 depicts an example of a configuration of a symmetric multiprocessor using core processor chip in the form of processor node in accordance with an illustrative embodiment.

The illustrative embodiments provide a mechanism for an adaptive spill-receive capability for lateral caches. Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a mechanism where each cache learns whether the cache should perform as a spill cache or a receive cache for best overall performance this is only an example and is not intended to state or imply any limitation with regard to the features of the present invention. To the contrary, the illustrative embodiments are intended to include distributed data processing environments and embodiments in which a cache learns whether to operate as a spill cache or a receive cache for best overall performance.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures. FIG. 1 depicts a pictorial representation of an example distributed data processing system in which aspects of the illustrative embodiments may be implemented. Core processor chip 100 may have one or more processor cores 102. Each processor core may simply be referred to as a core. A processor core may have multithreading capability, error detection and recovery functions, numerous general purpose registers (GPR), and special purpose registers (SPR).

In accordance with an illustrative embodiment, processor core 102 may be connected to level 2 (L2) cache 104 and non-cacheable unit (NCU) 106. Non-cacheable unit 106 may handle store commands by placing command, address, and data received from processor core 102 onto fabric bus 108 for storage to main memory. Such stores may alternatively be to memory-mapped I/O or registers. Non-cacheable unit 106 may handle load commands by placing command and address received from processor core 102 onto fabric bus 108 for access to memory or memory mapped I/O or registers and receives returned data from fabric bus 108. Access to memory that may be susceptible to frequent accesses later may be stored to level 2 cache 104 in order to reduce latency of future operations performed by processor core 102.

Level 2 cache 104 may similarly provide access to its contents via fabric bus 108 which may interconnect to other chips on the same board and also beyond the board upon which core processor chip 100 is placed. A nearby, but off-chip, level 3 (L3) cache 110 may be provided. Controls governing access between processor core 102 and level 3 cache 110 are in level 3 cache controls 112. Similarly, memory controller 114 and I/O interface 116 may be provided on-chip to facilitate long-latency access to memory 118 and to various I/O hubs 120, respectively.

Symmetric multi-processor (SMP) fabric controls 122 is a special purpose device that mediates the contention for fabric bus 108 by the various attached devices and provides for symmetric multi-processor topology configuration via expansion ports A, B, X, Y and Z 124. Five expansion ports are shown in the embodiment; however, it is understood that to achieve varying levels of complex multi-chip topologies, fewer or more expansion ports may be used. It is anticipated that five ports may provide 64 chips with rapid instruction, data and timing signals among them.

Pervasive controls 126 are circuits that exist both outside and mingled within the various processing blocks found on chip. Among the functions of pervasive controls 126 are providing of back-ups to the processor state on each processor core 102 by providing redundant copies of various general purpose registers and special purpose registers of each processor core 102 at convenient instruction boundaries of each processor core 102. In addition, pervasive controls 126 may assist in the detection of errors and communication of such errors to outside support processors (service processors) 128 for further action by, e.g. out-of-band firmware. It should be noted that the terms "support processor" and "service processor" may be used interchangeably.

Pervasive controls 126 are a gating point for redundant oscillators 130 and provide or receive derivative timing signals. It is appreciated that a fault or other condition may remove one or more redundant oscillators 130 from the configuration, and it is an object of pervasive controls 126 to select the better timing signal (or at least one that is within tolerances) from among redundant oscillators 130 and step-encoded signals that may arrive via expansion ports A, B, X, Y and Z 124.

Pervasive controls 126 may also contain control state machines for starting and stopping clocks, scanning of Level Sensitive Scan Design (LSSD) latches, and serial communication paths (SCOM) to register facilities, in response to stimulus from support processors 128.

FIG. 2 depicts an example of a configuration of a symmetric multiprocessor using core processor chip 100 of FIG. 1 in the form of processor node 200 in accordance with an illustrative embodiment. Processor node 200 may contain one or more of service processor 202, memory banks 204, I/O hubs 206, fabric expansion port 208, and off-node fabric expansion ports 210. Fabric expansion port 208 and off-node fabric expansion ports 210 provide connectivity for A and B ports 212 from each of multi-chip modules (MCM) 214 to multi-chip modules on other processor nodes. Fabric ports X, Y, and Z 216 interconnect multi-chip modules 214 within processor node 200. Fabric ports X, Y, Z, A, and B relate to fabric bus 108, SMP fabric controls 122, and expansion ports A, B, X, Y and Z 124 from FIG. 1.

Additionally, memory banks 204 are connected to multi-chip modules 214 through connections 218 which relate to the connection between memory controller 114 and memory 118 of FIG. 1. Each of multi-chip modules 214 may be identical in its hardware configuration but configured by firmware during system initialization to support varying system topologies and functions as, e.g. enablement of master and slave functions or connectivity between various combinations of multiple nodes in a scalable multi-node symmetric multi-processor system.

Within a particular multi-chip module there may be found core processor chip 220 which relates to core processor chip 100 of FIG. 1, as well as level 3 cache 222 which relates to level 3 cache 110 of FIG. 1. Processor node 200 may have one or more oscillators 224 routed to each chip found on processor node 200. Connections between oscillators 224 and functional units extend throughout the board and chips but are not shown in FIG. 2 in order to limit clutter. Similarly, it is understood that many convoluted interconnects exist between fabric expansion port 208, off-node fabric expansion ports 210, and I/O hubs 206 to the various chips on the board, such as A and B ports 212 and I/O ports 226 of multi-chip module 214, among other components, though such interconnects are not shown in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

For improved cache performance, caches of applications that have a small working set may be made available to applications that utilize more cache space so that overall cache performance may be improved. However, spilling lines of streaming applications to other applications may degrade overall performance because cache lines of streaming applications may be less likely to be re-referenced soon. Thus, the decision of whether a cache should spill or receive in a lateral cache, such as that shown in FIG. 2, organization should be done carefully, otherwise, cache performance may worsen compared to a cache where there are no spills. Therefore, the illustrative embodiments provide a mechanism where each cache learns whether the caches should perform as a spill cache or a receive cache for best overall performance. The mechanism is implemented by dedicating some sets of each cache to "always spill" and some sets of each cache to "always receive". A saturating counter for each cache tracks which of the two policies incurs fewest misses on the dedicated sets. The remaining sets of the cache use the policy that has fewest misses as indicated by the most significant bit of the saturating counter.

Figure 3:
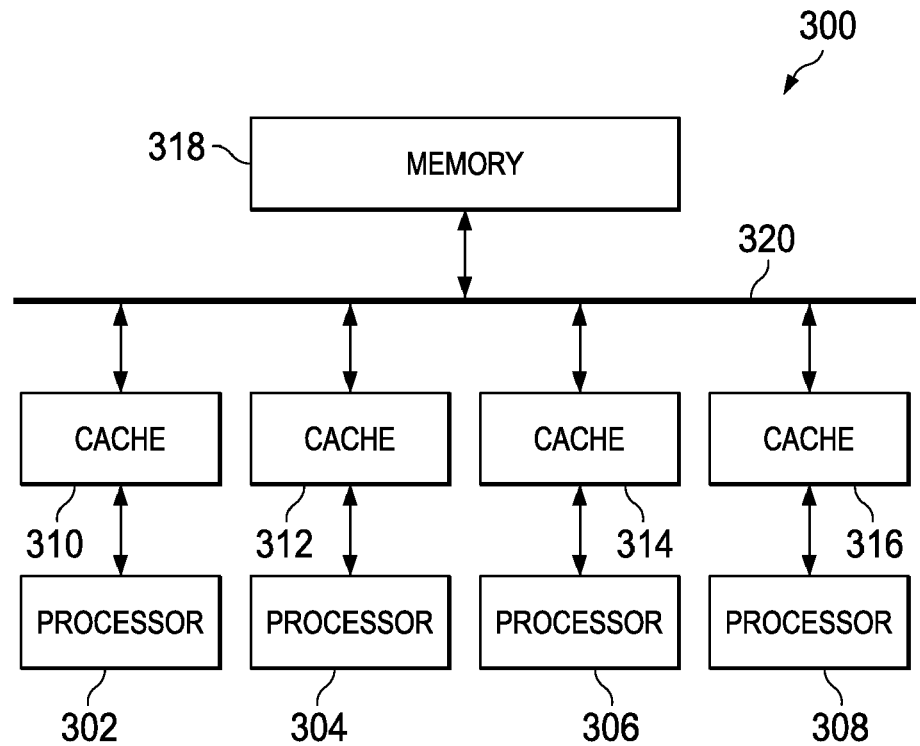
FIG. 3 illustrates a simplified example of a chip multi-processor (CMP) configuration in accordance with an illustrative embodiment.

FIG. 3 illustrates a simplified example of a chip multi-processor (CMP) configuration in accordance with an illustrative embodiment. CMP configuration 300 comprises processor cores 302, 304, 306, and 308 that are each coupled to a respective private last level cache (LLC) 310, 312, 314, or 316. LLCs 310, 312, 314, and 316 are considered to be lateral caches because they are at the same level of a cache hierarchy within a processor or data processing system. LLCs 310, 312, 314, and 316 are further coupled to memory 318 through connection 320, which may be a fabric port, bus, or the like. As discussed previously, a challenge in managing a private cache architecture, such as that created by LLCs 310, 312, 314, and 316, is to share cache capacity when one processor or processor core needs more cache and other processors or processor cores have extra cache capacity. Thus, the illustrative embodiments provide for a cache spill mechanism among LLCs 310, 312, 314, and 316. When a line is evicted from one cache, instead of discarding the line, the line can be placed in another cache at the same level.

FIG. 4 illustrates an embodiment of the proposed mechanism for a data processing system with four caches each associated with one processor in accordance with an illustrative embodiment. For simplicity, each of caches 402, 404, 406, and 408 in data processing system 400 is shown with only 32 sets. Each of caches 402, 404, 406, and 408 learns how to minimize overall misses by either acting as a spill cache (the one which spills evicted lines) or by acting as a receive cache (the one that receives a spilled line). The illustrative embodiments constrain sets within caches 402, 404, 406, and 408 to act as either spill cache sets or receive cache sets but not both. When a cache line is evicted from a spill cache because of a demand miss, the evicted line may be stored in a receive cache. If there is more than one receive cache in data processing system 400, ties to store the spilled line may be broken arbitrarily.

Each of the sets in caches 402, 404, 406, and 408 not dedicated to spill or receive learns whether to spill or receive by using, for example, set dueling or the like. In the illustrative embodiments, two sets of the 32 sets in each of caches 402, 404, 406, and 408 are guaranteed to always spill and two sets in each of caches 402, 404, 406, and 408 are guaranteed to always receive, although one of ordinary skill in the art would recognize that more or less set may be guaranteed to spill or receive. For example, in cache 402, set 7 and set 21 always spill and set 14 and set 28 always receive. Saturating counter 410 keeps track of which of the two policies (spill or receive) minimizes overall cache misses. Saturating counter 410 is dedicated to learning the spill/receive decision for cache 402. A miss in set 7 or set 21 in any of caches 402, 404, 406, and 408 decrements saturating counter 410, whereas, a miss in set 14 or set 28 in any of caches 402, 404, 406, and 408 increments saturating counter 410. The most significant bit (MSB) of saturating counter 410 then indicates which of the two policies (spill/receive) for cache 402 minimizes overall misses. The remainder 28 sets, sets 1-6, 8-13, 15-20, 22-27, and 29-31, of cache 402 then use the policy decided by saturating counter 410, using spill if the MSB of saturating counter 410 is a 1 and receive otherwise.

Similarly, caches 404, 406, and 408 in data processing system 400 learn which policy, spill or receive, works best for minimizing overall misses by using their respective one of saturating counters 412, 414, and 416 and dedicated spill and receive sets. As is illustrated in data processing system 400, the dedicated spill and receive sets are different for each of caches 402, 404, 406, and 408. This concept may be extended to a data processing system that has any number of caches. The number of dedicated sets may be varied and may be chosen arbitrarily. In general, 16-32 sets are sufficient to learn the decision for each cache. Similarly, other metrics such as memory access latency may be minimized instead of missed. For example, if a remote hit costs $\frac{1}{4}^{th}$ the cycle as memory access, then the remote hit may be considered a miss with a probability of 0.25 and the corresponding one of saturating counters 410, 412, 414, and 416 updated accordingly.

Thus, in order to increase the performance of a data processing system, the caches within the data processing system decide whether the cache should spill or receive. Misses to the dedicated sets of each cache increment or decrement a corresponding saturating counter that tracks which of the spill or receive policies incurs the fewest misses. The remaining sets of each cache use the policy that has fewest misses as indicated by the most significant bit of the corresponding saturating counter.

Figure 5:
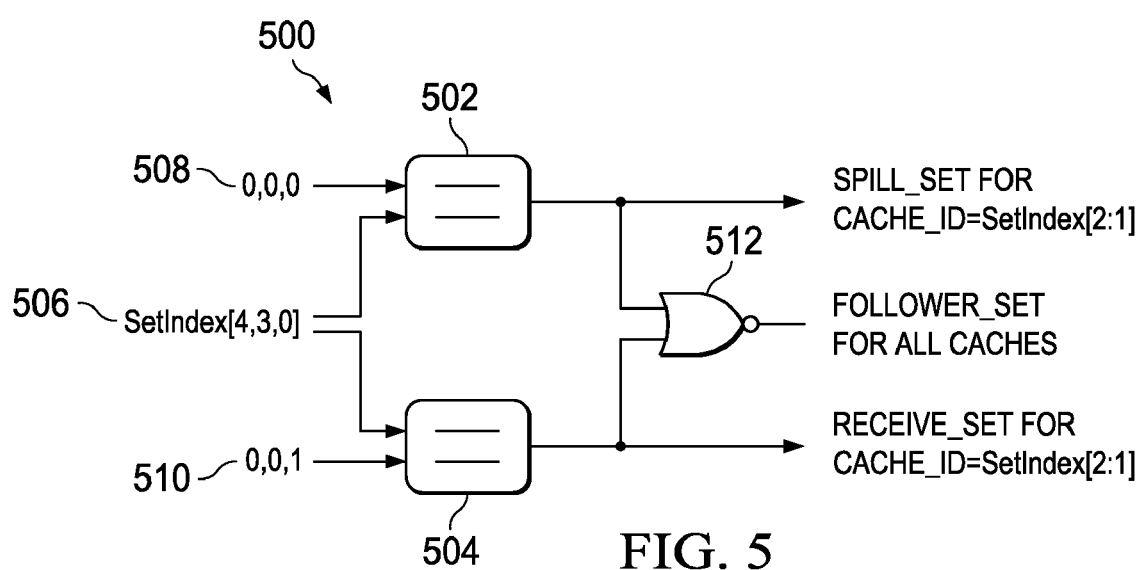
FIG. 5 depicts an example of logic that may be used to determine spill sets, receive sets, and follower sets for a four cache system in accordance with an illustrative embodiment.

The sets dedicated to "spill" or "receive" for each cache in the data processing system may be selected randomly, using a hash function, or by another means that identifies unique groups of sets for each of the caches in the data processing system. FIG. 5 depicts an example of logic that may be used to determine spill sets, receive sets, and follower sets for a four cache system in accordance with an illustrative embodiment. In this example, the four caches (CacheID 0 to 3) each have 1024 sets or $2^{10}$ sets; therefore, 10 bits will be required to index into any set in the caches, referred to as SetIndex[9:0]. In order to dedicate 32 sets for "always receive" and 32 sets for "always spill" of the 1024 sets for each cache, each cache is first divided into 32 equal regions and one spill set and receive set are selected from each region. Thus, SetIndex[9:5] will identify the region number and the remaining bits (SetIndex[4:0]) identify the set within the region.

Using logic 500 to select just one spill and receive set for each cache within each region may be performed by selecting the first and second set, set 0 and set 1, in each region to act as spill and receive, respectively, for Cache 0. The third and fourth set, set 2 and set 3, in each region will act as spill and receive, respectively, for Cache 1. The fifth and sixth set, set 4 and set 5, in each region will act as spill and receive, respectively, for Cache 2. The seventh and eighth set, set 6 and set 7, in each region will act as spill and receive, respectively, for Cache 3. All other sets in the region are follower sets. That is, a follower set follows the MSB of the corresponding saturating counter, such as saturating counter 410 of FIG. 4, for that cache. In logic 500, one input into comparators 502 and 504 are SetIndex [4,3,0] bits 506 which correlate to the fourth, the third, and the zero bits of the 10 bits required to index into any set in the caches. In comparator 502, SetIndex [4,3,0] bits 506 are compared to static bits 508 which are 0,0,0. If the fourth, the third, and the zero bits of SetIndex [4,3,0] bits 506 directly correlate with static bits 508, then comparator 502 outputs a 1. If the output of comparator 502 is 1 then the set will operate as a spill set and the processor core for which the set is the spill set is identified by SetIndex bits [2:1]. In comparator 504, SetIndex [4,3,0] bits 506 are compared to static bits 510 which are 0,0,1. If the fourth, the third, and the zero bits of SetIndex [4,3,0] bits 506 directly correlate with static bits 510, then comparator 504 outputs a 1. If the output of comparator 504 is 1 then the set will operate as a receive set and the processor core for which the set is the receive set is identified by SetIndex bits [2:1]. If the output of comparator 502 or 504 is not a 1 then the set is neither a dedicated spill nor a dedicated receive, therefore nor gate 512 identifies this set as a follower set for all the caches.

Figures 6, 7:
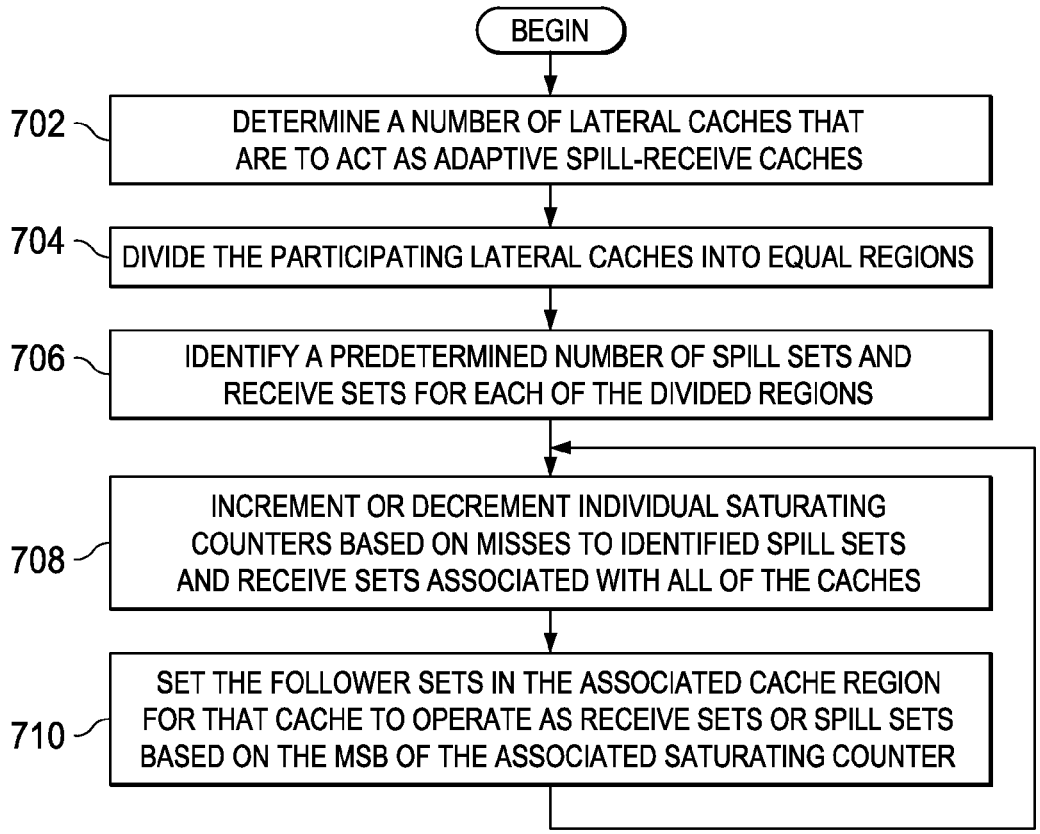
FIG. 6 depicts a table of decisions made by logic in accordance with an illustrative embodiment.
FIG. 7 illustrates an example operation performed to determine whether follower sets within a cache should perform as spill cache sets or receive cache sets for best overall performance of a data processing system in accordance with an illustrative embodiment.

FIG. 6 depicts a table of decisions made by logic 500 in FIG. 5 in accordance with an illustrative embodiment. As shown in table 600, set 0 is designated as the spill set for cache 0 and set 1 is designated as the receive set for cache 0. That is, set 0 and set 1 in all four caches are the sets that increment or decrement the saturating counter associated with cache 0. Likewise, set 2 is designated as the spill set for cache 1 and set 3 is designated as the receive set for cache 1. That is, set 2 and set 3 in all four caches are the sets that increment or decrement the saturating counter associated with cache 1. Similarly, set 4 is designated as the spill set for cache 2 and set 5 is designated as the receive set for cache 2. That is, set 4 and set 5 in all four caches are the sets that increment or decrement the saturating counter associated with cache 2. Finally, set 6 is designated as the spill set for cache 3 and set 7 is designated as the receive set for cache 3. That is, set 6 and set 7 in all four caches are the sets that increment or decrement the saturating counter associated with cache 3. Sets 8-31 are follower sets for all caches.

FIG. 7 illustrates an example operation performed to determine whether follower sets within a cache should perform as spill cache sets or receive cache sets for best overall performance of a data processing system in accordance with an illustrative embodiment. As the operation begins a cache controller within the data processing system determines a number of lateral caches that are to act as adaptive spill-receive caches (step 702). Once the number of participating lateral caches is determined, the cache controller divides the participating lateral caches into equal regions (step 704). Then the cache controller identifies a predetermined number of spill sets and receive sets for each of the divided regions (step 706), as described in FIGS. 5 and 6. Individual saturating counters associated with each of the participating lateral caches then decrement or increment based on misses to the identified spill sets and receive sets of all of the caches (step 708). The follower sets, i.e. those sets not identified as spill sets or receive sets, in the associated cache region for that cache then operate as receive sets or spill sets based on the most significant bit (MSB) of the associated saturating counter with which the follower sets are associated (step 710). The operation returns to step 708 so that the follower sets may change their settings based on an indication from an associated saturating counter.

Figure 8:
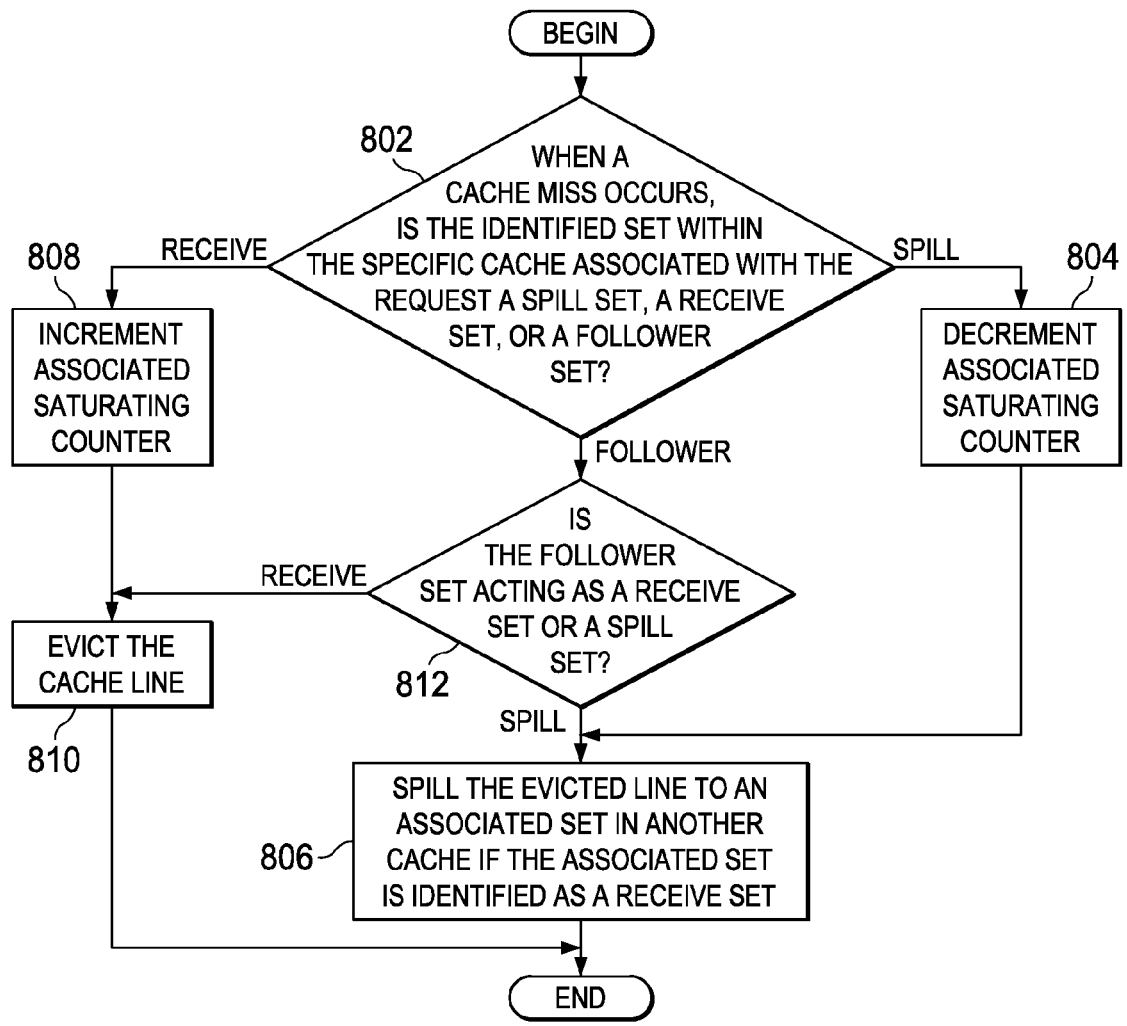
FIG. 8 illustrates an example operation performed when a cache miss occurs in accordance with an illustrative embodiment.

FIG. 8 illustrates an example operation performed when a cache miss occurs in accordance with an illustrative embodiment. When a cache miss occurs, the cache controller retrieves the requested data from main memory and stores the data in the cache set associated with the original data request. Since the data currently in the cache set needs to be evicted, the cache controller identifies whether the cache set associated with the needing-to-be evicted data is a spill set, a receive set, or a follower set (step 802). If at step 802 the cache set is a spill set, then the cache controller decrements the associated saturating counter (step 804) and spills the evicted data to an associated set in another cache if the associated set is identified as a receive set (step 806), with the operation ending thereafter.

If at step 802 the cache set is a receive set, then the cache controller increments the associated saturating counter (step 808) and evicts the cache line (step 810), with the operation terminating thereafter. If at step 802 the cache set is a follower set, then the cache controller determines if the follower set is acting like a receive set or a spill set (step 812). If at step 812 the follower set is operating as a spill set, then the operation proceeds to step 806. If at step 812 the follower set is operating as a receive set then the operation proceeds to step 810.

Figure 9:
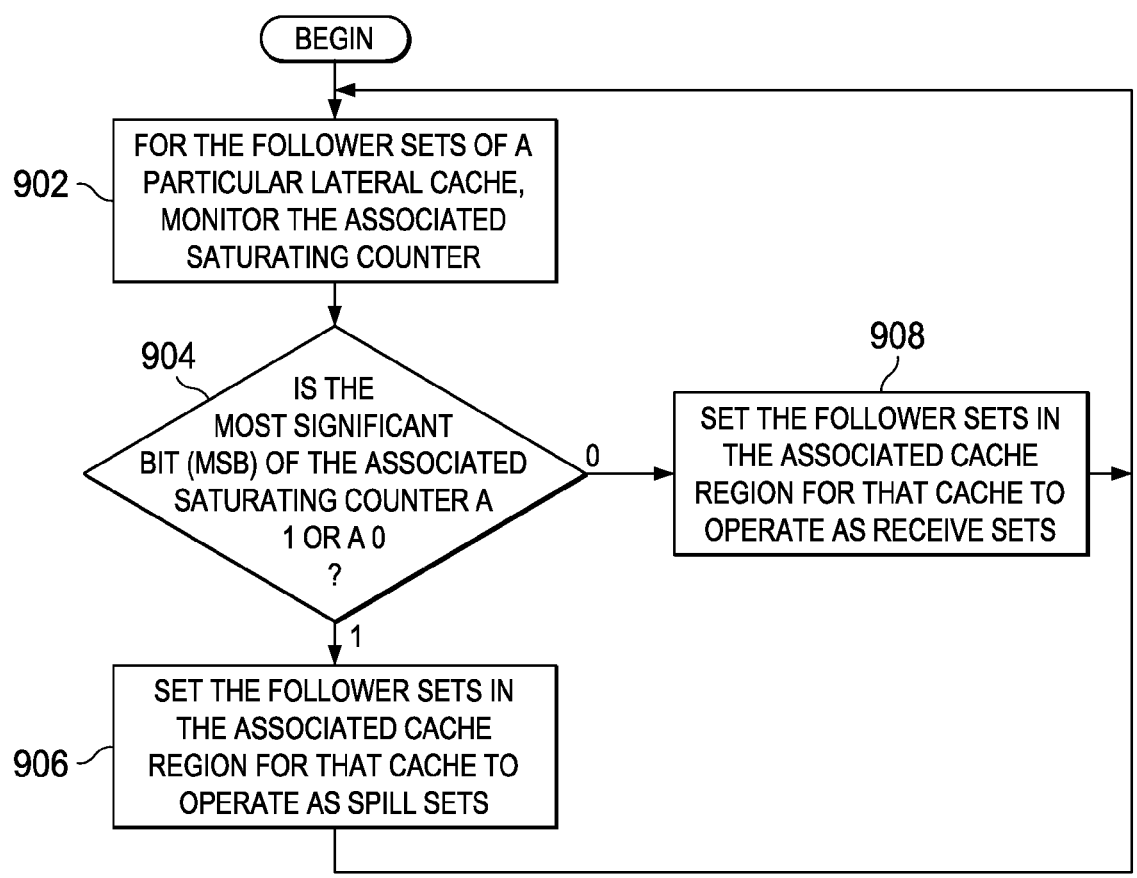
FIG. 9 illustrates an example operation performed to set follower sets of a particular cache region to act as either receive sets or spill sets in accordance with an illustrative embodiment.

FIG. 9 illustrates an example operation performed to set follower sets of a particular cache region to act as either receive sets or spill sets in accordance with an illustrative embodiment. As the operation begins, the cache controller monitors the saturating counter (step 902). The cache controller determines if the most significant bit (MSB) is a 1 or a 0 (step 904). If at step 904 the MSB of a particular saturating counter is a 1, then the cache controller sets the follower sets in the associated cache region for that cache to operate as spill sets (step 906), with the operation returning to step 902 thereafter. If at step 904 the MSB of a particular saturating counter is a 0, then the cache controller sets the follower sets in the associated cache region for that cache to operate as receive sets (step 908), with the operation returning to step 902 thereafter.

Thus, the illustrative embodiments provide mechanisms for determining whether caches should perform as a spill cache or a receive cache for best overall performance. The mechanism is implemented by dedicating some sets of each cache to "always spill" and some sets of each cache to "always receive". A saturating counter for each cache tracks which of the two policies incurs fewest misses on the dedicated sets. The remaining sets of the cache use the policy that has fewest misses as indicated by the most significant bit of the saturating counter.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for improving cache performance, the method comprising:
   monitoring a counter associated with a cache;
   determining whether the counter indicates that a plurality of non-dedicated cache sets within the cache should operate as spill cache sets or receive cache sets;
   responsive to an indication that the plurality of non-dedicated cache sets should operate as the spill cache sets, setting the plurality of non-dedicated cache sets to spill an evicted cache line to an associated cache set in another cache in the event of a cache miss, wherein the indication that the plurality of non-dedicated cache sets should operate as the spill cache sets is indicated by the most significant bit of the counter indicating a first value; and
   responsive to an indication that the plurality of non-dedicated cache sets should operate as the receive cache sets, setting the plurality of non-dedicated cache sets to receive an evicted cache line from another cache set in the event of the cache miss, wherein the indication that the plurality of non-dedicated cache sets should operate as the receive cache sets is indicated by the most significant bit of the counter indicating a second value that is different from the first value.

2. The method of claim 1, further comprising:
   receiving a signal that the cache miss has occurred, wherein the cache miss is associated with a cache set in a plurality of cache sets;
   responsive to receiving the signal, determining whether the cache set is designated as a receive set, a spill set, or a follower set;
   responsive to the cache set being designated as the receive set, incrementing the counter; and
   evicting data associated with the cache set.

3. The method of claim 2, further comprising:
   responsive to the cache set being designated as the spill set, decrementing the counter; and
   spilling the data associated with the cache set to the associated cache set in the another cache.

4. The method of claim 2, further comprising:
   responsive to the cache set being designated as the follower set, determining whether the follower set is acting as a spill set or a receive set;
   responsive to the follower set acting as the receive set, evicting data associated with the cache set.

5. The method of claim 4, further comprising:
   responsive to the follower set acting as the spill set, spilling the data associated with the cache set to the associated cache set in the another cache.

6. The method of claim 1, wherein the non-dedicated set is a cache sets are follower sets.

7. The method of claim 1, further comprising:
   receiving a signal that a cache hit has occurred;
   determining whether the cache hit has incurred more than a predetermined threshold of cycles during a data fetch to a cache set in a plurality of cache sets;
   responsive to the cache hit incurring more than the predetermined threshold of cycles, determining whether the cache set is designated as a receive set, a spill set, or a follower set;
   responsive to the cache set being designated as the receive set, incrementing the counter and evicting data associated with the cache set;
   responsive to the cache set being designated as the spill set, decrementing the counter and spilling the data associated with the cache set to the associated cache set in the another cache; and
   responsive to the cache set being designated as the follower set, determining whether the follower set is acting as a spill set or a receive set and responsive to the follower set acting:
      as the receive set, evicting data associated with the cache set; and
      as the spill set, spilling the data associated with the cache set to the associated cache set in the another cache.

8. A computer program product comprising a non-transitory computer recordable medium having a computer readable program recorded thereon, wherein the computer readable program, when executed on a computing device, causes the computing device to:
   monitor a counter associated with a cache;
   determine whether the counter indicates that a plurality of non-dedicated cache sets within the cache should operate as spill cache sets or receive cache sets;
   responsive to an indication that the plurality of non-dedicated cache sets should operate as the spill cache sets, set the plurality of non-dedicated cache sets to spill an evicted cache line to an associated cache set in another cache in the event of a cache miss, wherein the indication that the plurality of non-dedicated cache sets should operate as the spill cache sets is indicated by the most significant bit of the counter indicating a first value; and
   responsive to an indication that the plurality of non-dedicated cache sets should operate as the receive cache sets, set the plurality of non-dedicated cache sets to receive an evicted cache line from another cache set in the event of the cache miss, wherein the indication that the plurality of non-dedicated cache sets should operate as the receive cache sets is indicated by the most significant bit of the counter indicating a second value that is different from the first value.

9. The computer program product of claim 8, wherein the computer readable program further causes the computing device to:

receive a signal that the cache miss has occurred, wherein the cache miss is associated with a cache set in a plurality of cache sets;

responsive to receiving the signal, determine whether the cache set is designated as a receive set, a spill set, or a follower set;

responsive to the cache set being designated as the receive set, increment the counter and evict data associated with the cache set;

responsive to the cache set being designated as the spill set, decrement the counter and spill the data associated with the cache set to the associated cache set in the another cache; and responsive to the cache set being designated as the follower set, determine whether the follower set is acting as a spill set or a receive set and responsive to the follower set acting:
  as the receive set, evict data associated with the cache set; and
  as the spill set, spill the data associated with the cache set to the associated cache set in the another cache.

10. The computer program product of claim 8, wherein the computer readable program further causes the computing device to:

receive a signal that a cache hit has occurred;

determine whether the cache hit has incurred more than a predetermined threshold of cycles during a data fetch to a cache set in a plurality of cache sets;

responsive to the cache hit incurring more than the predetermined threshold of cycles, determine whether the cache set is designated as a receive set, a spill set, or a follower set;

responsive to the cache set being designated as the receive set, increment the counter and evicting data associated with the cache set;

responsive to the cache set being designated as the spill set, decrement the counter and spilling the data associated with the cache set to the associated cache set in the another cache; and responsive to the cache set being designated as the follower set, determine whether the follower set is acting as a spill set or a receive set and responsive to the follower set acting:
  as the receive set, evict data associated with the cache set; and
  as the spill set, spill the data associated with the cache set to the associated cache set in the another cache.

11. An apparatus, comprising:
a processor; and
a memory coupled to the processor, wherein the memory comprises instructions which, when executed by the processor, cause the processor to:
monitor a counter associated with a cache;
determine whether the counter indicates that a plurality of non-dedicated cache sets within the cache should operate as spill cache sets or receive cache sets;
responsive to an indication that the plurality of non-dedicated cache sets should operate as the spill cache sets, set the plurality of non-dedicated cache sets to spill an evicted cache line to an associated cache set in another cache in the event of a cache miss, wherein the indication that the plurality of non-dedicated cache sets should operate as the spill cache sets is indicated by the most significant bit of the counter indicating a first value; and
responsive to an indication that the plurality of non-dedicated cache sets should operate as the receive cache sets, set the plurality of non-dedicated cache sets to receive an evicted cache line from another cache set in the event of the cache miss, wherein the indication that the plurality of non-dedicated cache sets should operate as the receive cache sets is indicated by the most significant bit of the counter indicating a second value that is different from the first value.

12. The apparatus of claim 11, wherein the instructions further cause the processor to:

receive a signal that the cache miss has occurred, wherein the cache miss is associated with a cache set in a plurality of cache sets;

responsive to receiving the signal, determine whether the cache set is designated as a receive set, a spill set, or a follower set;

responsive to the cache set being designated as the receive set, increment the counter and evict data associated with the cache set;

responsive to the cache set being designated as the spill set, decrement the counter and spill the data associated with the cache set to the associated cache set in the another cache; and responsive to the cache set being designated as the follower set, determine whether the follower set is acting as a spill set or a receive set and responsive to the follower set acting:
  as the receive set, evict data associated with the cache set; and
  as the spill set, spill the data associated with the cache set to the associated cache set in the another cache.

13. The apparatus of claim 11, wherein the instructions further cause the processor to:

receive a signal that a cache hit has occurred;

determine whether the cache hit has incurred more than a predetermined threshold of cycles during a data fetch to a cache set in a plurality of cache sets;

responsive to the cache hit incurring more than the predetermined threshold of cycles, determine whether the cache set is designated as a receive set, a spill set, or a follower set;

responsive to the cache set being designated as the receive set, increment the counter and evicting data associated with the cache set;

responsive to the cache set being designated as the spill set, decrement the counter and spilling the data associated with the cache set to the associated cache set in the another cache; and responsive to the cache set being designated as the follower set, determine whether the follower set is acting as a spill set or a receive set and responsive to the follower set acting:
  as the receive set, evict data associated with the cache set; and
  as the spill set, spill the data associated with the cache set to the associated cache set in the another cache.

* * * * *